United States Patent
Weston

(10) Patent No.: US 6,950,560 B2
(45) Date of Patent: Sep. 27, 2005

(54) SPATIAL VIDEO PROCESSING

(75) Inventor: Martin Weston, Petersfield (GB)

(73) Assignee: Snell & Wilcox Limited, Twickenham (GB)

( * ) Notice: Subject to any disclaimer, the term of this patent is extended or adjusted under 35 U.S.C. 154(b) by 652 days.

(21) Appl. No.: 09/826,392

(22) Filed: Apr. 4, 2001

(65) Prior Publication Data

US 2002/0047932 A1 Apr. 25, 2002

(30) Foreign Application Priority Data

Apr. 5, 2000 (GB) .............................. 0008402

(51) Int. Cl.$^7$ ............................................... G06K 9/40
(52) U.S. Cl. ...................................... 382/261; 382/266
(58) Field of Search ................................ 398/448, 452, 398/458; 382/260–270

(56) References Cited

U.S. PATENT DOCUMENTS

| | | | |
|---|---|---|---|
| 5,003,618 A | * | 3/1991 | Meno .......................... 382/261 |
| 5,086,488 A | | 2/1992 | Kato et al. |
| 5,142,380 A | | 8/1992 | Sakagami et al. |
| 5,249,053 A | | 9/1993 | Jain |
| 5,438,625 A | | 8/1995 | Klippel |
| 5,512,956 A | | 4/1996 | Yan |
| 5,629,779 A | | 5/1997 | Jeon |
| 5,642,115 A | | 6/1997 | Chen |
| 5,671,298 A | | 9/1997 | Markandey et al. |
| 5,748,245 A | | 5/1998 | Shimizu et al. |
| 5,802,218 A | | 9/1998 | Brailean |
| 5,812,197 A | | 9/1998 | Chan et al. |
| 5,831,688 A | | 11/1998 | Yamada et al. |
| 5,930,398 A | | 7/1999 | Watney |
| 5,991,456 A | | 11/1999 | Rahman et al. |
| 6,005,952 A | | 12/1999 | Klippel |
| 6,151,362 A | | 11/2000 | Wang |
| 6,163,573 A | | 12/2000 | Mihara |
| 6,181,382 B1 | * | 1/2001 | Kieu et al. .................. 348/459 |
| 6,269,120 B1 | | 7/2001 | Boice et al. |
| 6,278,735 B1 | | 8/2001 | Mohsenian |
| 6,285,716 B1 | | 9/2001 | Knee et al. |
| 6,427,031 B1 | * | 7/2002 | Price .......................... 382/264 |
| 6,437,827 B1 | | 8/2002 | Baudouin |
| 6,539,120 B1 | | 3/2003 | Sita et al. |
| 6,570,922 B1 | | 5/2003 | Wang et al. |
| 2001/0031009 A1 | | 10/2001 | Knee et al. |

* cited by examiner

*Primary Examiner*—Amelia M. Au
*Assistant Examiner*—Wes Tucker
(74) *Attorney, Agent, or Firm*—Michael Best & Friedrich LLC

(57) ABSTRACT

In video signal processing, diagonal lines or slopes are detected in the input material, and an adaptive spatial filter having positive, negative and linear filter apertures is employed. The positive filter aperture is employed upon detection of any positive slopes in excess of a defined positive threshold; the negative filter upon detection of negative slopes, and the linear filter otherwise.

7 Claims, 5 Drawing Sheets

Adaption control

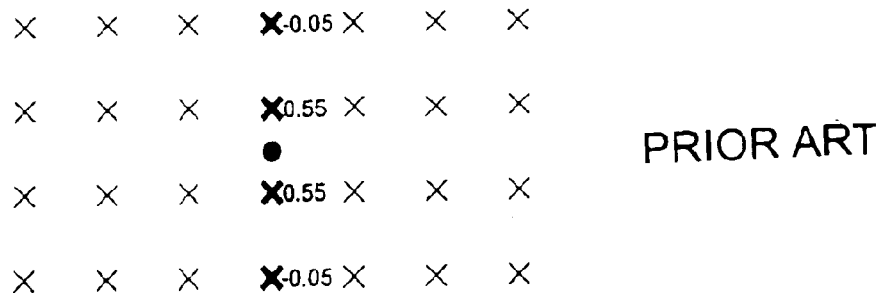
Figure 1: Linear aperture
Figure 2: Aperture for positive slope
Figure 3: Aperture for negative slope

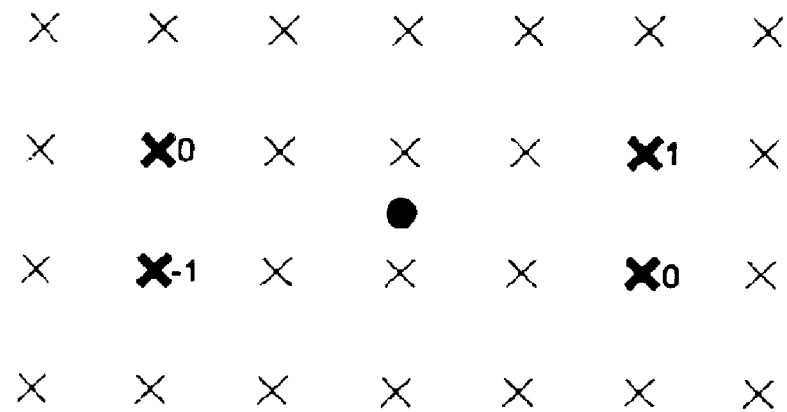
Figure 5: Gradient to detect positive slope
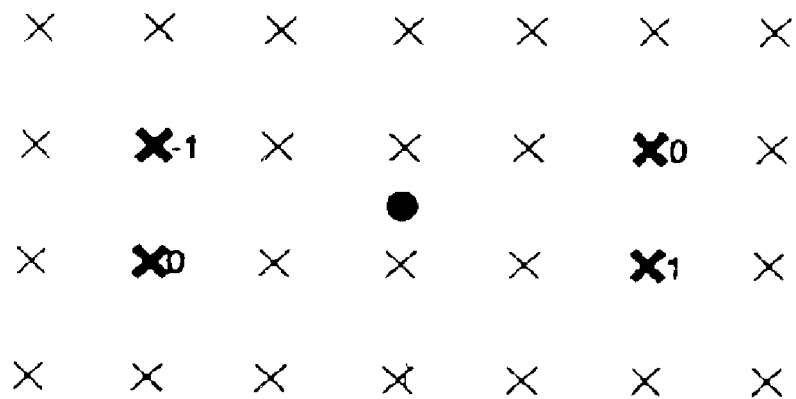
Figure 6: Gradient to detect negative slope

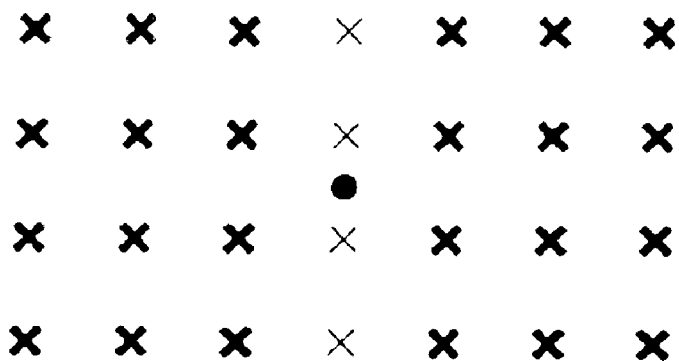
Figure 7: Aperture size for gradients
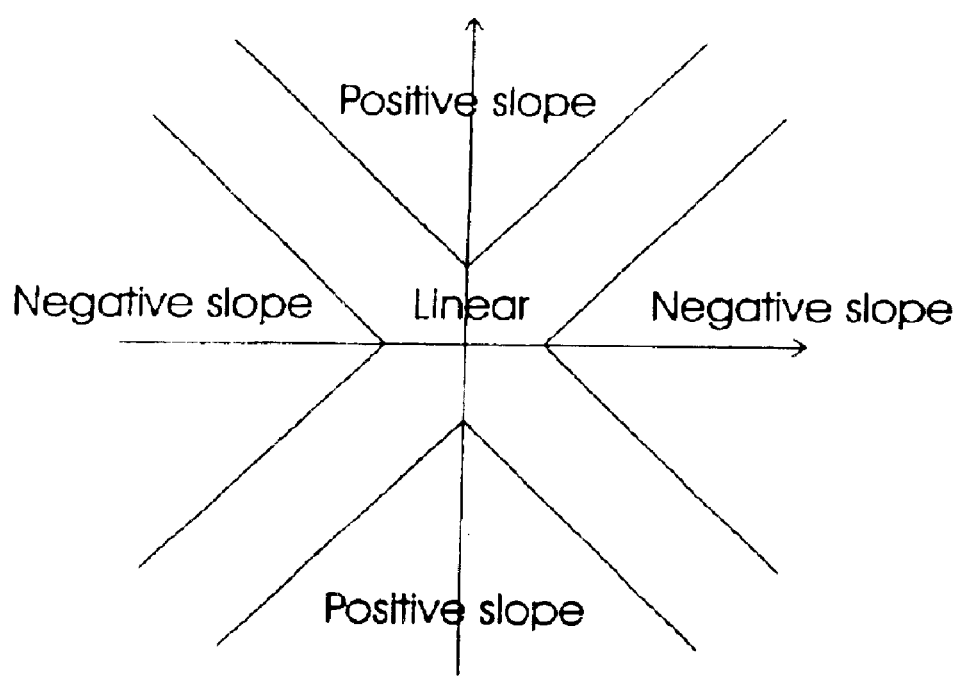
Figure 8: Adaption control

SPATIAL VIDEO PROCESSING

This application claims the benefit of GB Application No. 0008402.0 filed on Apr. 5, 2000, which application discloses the same subject matter described herein.

BACKGROUND

This invention relates to video processing and particularly to spatial video processing. An important example is the creation of additional lines through spatial interpolation.

A spatial interpolation filter has a filter aperture comprising an appropriate number and arrangement of neighbouring pixels and takes a weighted sum of contributions from pixels within that filter aperture. It has previously been recognised that such a filter can introduce smearing if there are pronounced slopes in the picture material. It is instructive to take the example of a striped image. A filter designed to take weighted sums of contributions along a vertical pixel line will be expected to function correctly as long as the stripes in the image are almost exactly horizontal. Essentially, weighted averages are taken along the stripe and therefore from pixels which are similar. If diagonal stripes are encountered, a weighted sum of contributions along a vertical pixel line will now mix pixels which are from different stripes and which may be very different. Smearing of the image is likely to result.

One approach to this problem, particularly where dealing with interlaced material, is to avoid using spatial interpolation and instead to utilise temporal interpolation. This might work well for stationary pictures but is unlikely to be a satisfactory solution where there is movement between successive pictures.

It has been proposed to improve spatial interpolation by measuring pronounced slopes in the picture material and then rotating the filter aperture into alignment with the measured slope. In the example of diagonal stripes, the angle of the stripe is measured and the filter aperture rotated so that weighted contributions are taken along the stripe, from pixels that remain similar. This proposal can be very helpful if the slope is measured accurately and the filter rotated into precise alignment. This can however be a complex operation. Moreover, if the filter is rotated by the wrong amount, the results can be as bad as, or sometimes worse than, if the aperture remained static. It is also a factor that if the filter aperture is to be able to accommodate shallow slopes (and it is shallow slopes that produce the most objectionable artefacts), a very wide filter aperture is required.

It is an object of this invention to provide improved video processing in which slopes are accommodated with greater tolerance to errors or variations in slope angles.

It is an object of one form of this invention to meet the performance of prior art slope processing with substantially smaller filter apertures.

SUMMARY

Accordingly, the present invention consists in one aspect in video processing apparatus comprising a set of spatial filter apertures and a slope detector, the apparatus selecting the appropriate filter aperture in accordance with the output of the slope detector and taking weighted contributions from pixels in the selected filter aperture, wherein the filter aperture weightings sum to unity over a line including the current pixel and sum to zero over either side of the said line.

Suitably, said line is vertical.

Advantageously, the set consists of three spatial filter apertures.

In another aspect, the present invention consists in video processing apparatus comprising a slope detector and a spatial filter having a positive filter aperture, a linear filter aperture and a negative filter aperture; wherein the positive filter aperture is employed upon detection of any positive slope in excess of a defined positive threshold; the negative filter aperture is employed upon detection of any negative slope in excess of a defined negative threshold; and the linear filter aperture is employed otherwise.

Advantageously, in each said filter aperture weighted contributions are taken from pixels with the filter aperture weightings summing to unity over a line including the current pixel and summing to zero over either side of the said line.

BRIEF DESCRIPTION OF THE DRAWINGS

Suitably, said line is vertical.

The invention will now be described by way of example with reference to the accompanying drawings, in which:

FIG. 1 is a diagram showing the pixel weightings for a known linear filter;

FIG. 2 is a diagram showing the pixel weightings for a positive slope filter aperture according to an embodiment of the invention;

FIG. 3 is a diagram showing the pixel weightings for a negative slope filter aperture according to an embodiment;

FIGS. 5 to 8 are diagrams illustrating an adaption process according to an embodiment of the invention.

DETAILED DESCRIPTION

The example will be taken of vertical interpolation. If a four tap vertical filter—such as that shown in FIG. 1—is used to vertically interpolate an interlaced picture the resulting image will be soft with various artefacts. One of the most noticeable artefacts is jagging on diagonal lines. Attempts have been made to try and reduce this jagging by twisting the vertical filter so it filters along the direction of the slope of the diagonal line. This will remove the jags, but such a filter is very dependent on knowing the exact slope of line, which is difficult to measure.

A preferred embodiment of the present invention uses a set of three filters. Rather than twisting the simple vertical filter of FIG. 1 to interpolate along the direction of the slope, a switch is made to the filter of FIG. 2 for a positive slope and to the filter of FIG. 3 for a negative slope. (The terms, positive slope and negative slope, in a picture, are often found confusing. In this specification, the nomenclature that is used denotes as positive a slope which rises vertically, from left to right.)

It can be seen that the filters of FIGS. 2 and 3 use high frequency contributions from horizontally displaced pixels. Thus weightings of the contributions from the central vertical line are the same as in the simple vertical filter and sum to unity. The weightings on either side of that line, sum to zero. High frequency information from adjacent pixels is thus being used to reduce jags in the image.

A possible explanation for the excellent results achieved with this arrangement is that it allows the removal of jags from edges that are very nearly horizontal (the most objectionable), using a fairly small aperture. Twisting the aperture to interpolate along the edge would require a much larger aperture.

Figure 4:
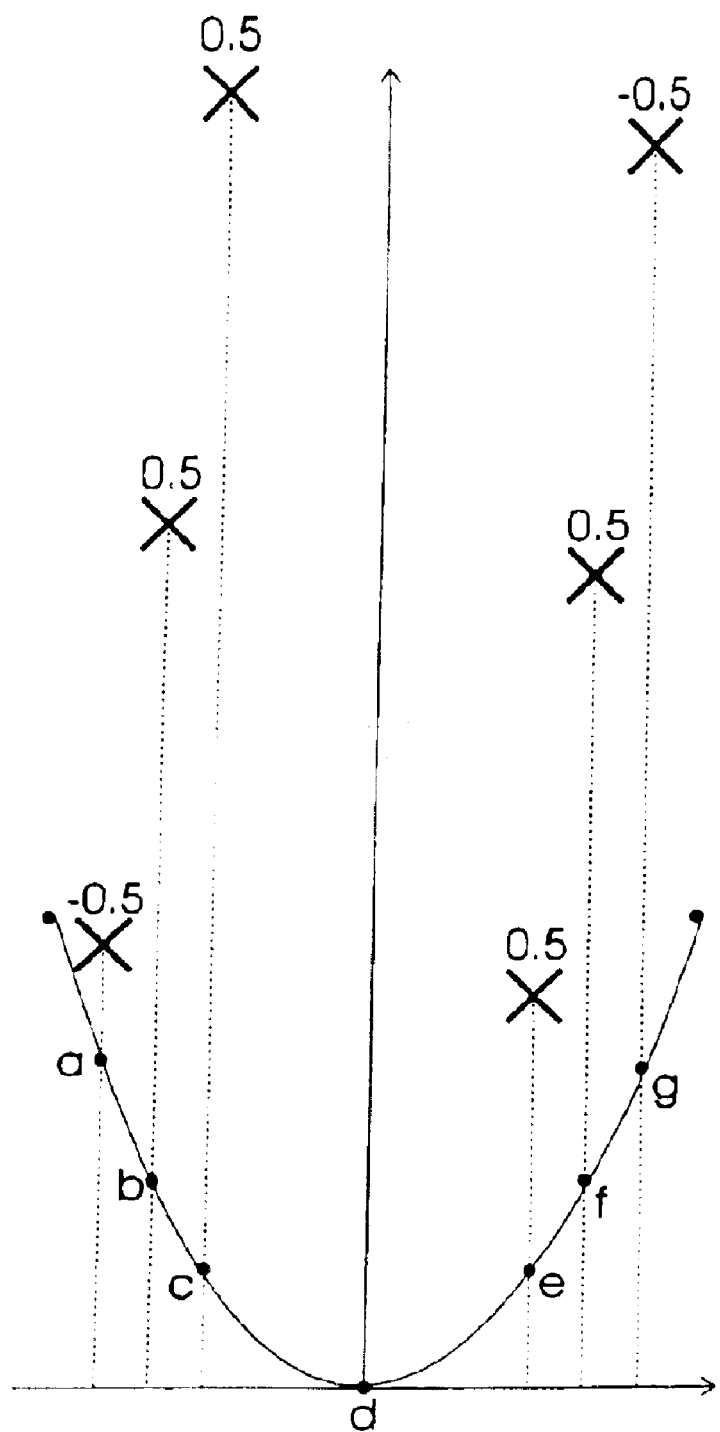
FIG. 4 is a diagram illustrating the manner of operation of the described embodiment.

Referring to FIG. 4, consider the picture contains a sloping edge, denoted by the solid vertical line. The voltage across the edge varies as shown by the marked parabola. If a vertical [0.5 0.5] filter were used the resulting interpolated voltage would be (b+f)/2, which is considerably larger than the correct result, d. If the aperture were skewed along the diagonal the resulting voltage would be (c+e)/2. In order for this to give the correct result the aperture would have to be 16 pixels wide horizontally. However, using the slope filter according to this embodiment of the invention, the interpolated voltage is (b+f−a+c−g+e)/2, which gives the correct answer.

In one embodiment, the adaption or switch between the positive, linear and negative slope filter apertures is effected as follows. The positive and negative gradients of the input picture signal are first calculated. The difference of these two values is then calculated, giving a gradient difference or switching signal. This signal is then filtered horizontally and vertically to produce a sort of threshold signal. This filtering step also increases the aperture size, considering pixels other than the particular ones specifically analysed in the slope filters, thereby ensuring that the adaption treats a broad range of slopes. If the threshold signal is within a specified range, the usual linear filter is used. However, if it is above this range, the positive slope filter is used, and similarly, if it is below, the negative filter is preferred.

In more detail, the adaption process includes the following steps:

Calculate the positive gradient ($g_p$) using the filter shown in FIG. 5

Calculate the negative gradient ($g_m$) using the filter shown in FIG. 6

Calculate the difference (d) of the absolute value of these two signals d=(abs($g_p$)−abs($g_m$))

Filter using 0.25 0.5 0.25 vertically and 0.25 0.5 0.25 horizontally to give $f_d$ Threshold signal $f_d$ to form positive slope switching signal for $f_d>5$, negative slope switching signal for $f_d<-5$ and linear switching signal for $-5<f_d<5$ It is advantageous that the gradient filters detect a range of slopes, which is why they are filtered vertically and horizontally by the 0.25 0.5 0.25 filters. Although this increases the aperture size of the mode selection filters (see FIG. 7) it produces a worthwhile improvement in picture quality.

The above adaption process is equivalent to dividing the the gradient space into the areas shown in FIG. 8. It will be recognised that this is only one example of a thresholding arrangement and modifications will be possible.

Figure 9:
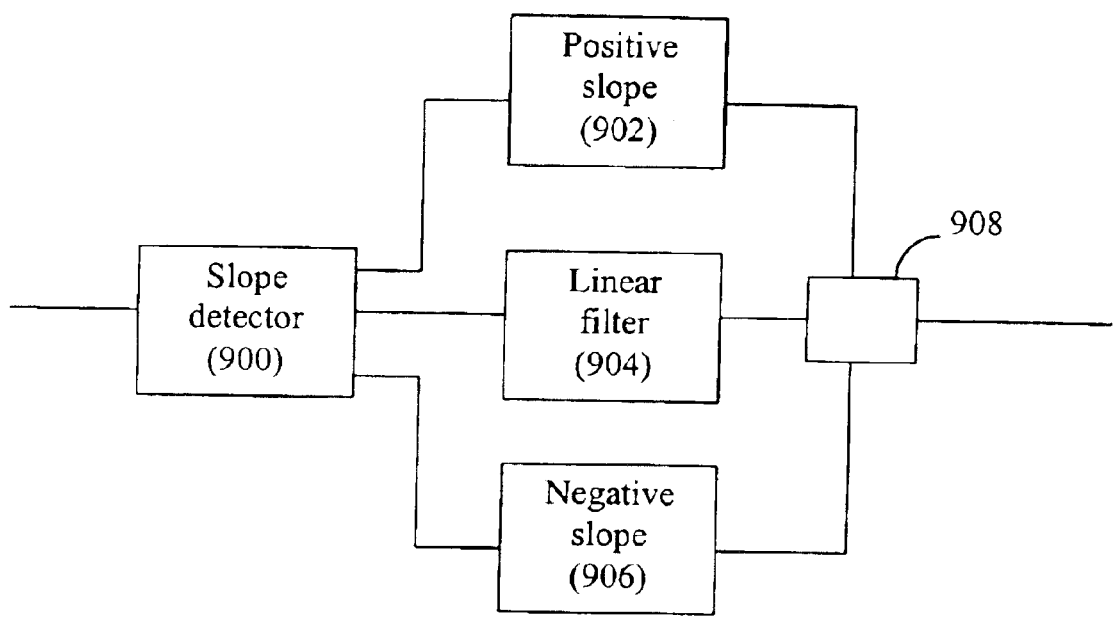
FIG. 9 is a diagram illustrating apparatus according to an embodiment of the invention.

FIG. 9 illustrates an apparatus according to the above described embodiments. An input signal is passed to a slope detector (900), which on detection of the relevant slope (or lack of), passes the signal to one of the positive slope (902), negative slope (906) or linear (904) filters. Typically, a simple switch between the filter outputs is performed at block 908. In certain cases, the input signal may be passed to more than one of the filters, and the outputs may be mixed in some proportion at 908.

Slope orientation filtering has been shown to give a significant improvement on picture quality over linear filtering. It does not appear to introduce significant artefacts and operates to reduce jagging without softening the picture. Although the described slope filters appear to work very well, alternatives are possible. In certain applications it may be appropriate to have more than one positive slope filter and more than one negative slope filter, with each filter aperture still having the feature that the pixel weightings sum to unity over the central line of the aperture and sum to zero over all pixels on each side either side of the central line.

Although the example has been taken of vertical interpolation, this invention encompasses other spatial filter operations and orientations other than vertical. In, for example, a horizontal interpolation filter according to this invention, pixel weightings would sum to unity over the central horizontal line of the aperture and sum to zero over all pixels on either side of the central line.

Similarly, although the adaption signal described here behaves reasonably well, numerous alternatives are possible. It will often be useful to include a temporal filter aperture, for use in place of the described spatial apertures, where there is no detected motion.

Some applications may require both de-interlacing and temporal interpolation. If this is the case there are a number of possible methods.

1. De-interlace first, followed by temporal interpolation—the disadvantage with this is the need to store the $1^{st}$ field.

2. De-interlace both fields at once and then temporally interpolate.

3. Include the temporal interpolation into each of the three adaption filters. In this case you would use the same adaption control for each temporal phase.

It should be understood that this invention has been described by way of examples only and that a wide variety of further modifications are possible without departing from the scope of the invention.

What is claimed is:

1. Video processing apparatus comprising a set of spatial filter apertures and a slope detector, the apparatus selecting the appropriate filter aperture in accordance with the output of the slope detector and taking weighted contributions from pixels in the selected filter aperture, wherein every spatial filter aperture in said set of spatial filter apertures has pixel weightings which sum to unity over a line including the current pixel and sum to zero over either side of the said line.

2. Apparatus according to claim 1, wherein said line is vertical.

3. Apparatus according to claim 1 or claim 2, wherein the set consists of three spatial filter apertures.

4. Video processing apparatus comprising a slope detector and a spatial filter having a positive filter aperture, a linear filter aperture and a negative filter aperture;

wherein the aperture of the spatial filter is selected in dependence upon the detected slope, such that the positive filter aperture is employed for all detected slopes greater than a defined positive slope threshold;

the negative filter aperture is employed for all detected slopes less than a defined negative slope threshold; and the linear filter aperture is employed for all detected slopes between said positive slope threshold and said negative slope threshold.

5. Apparatus according to claim 4, wherein in each said filter aperture weighted contributions are taken from pixels with the filter aperture weightings summing to unity over a line including the current pixel and summing to zero over either side of the said line.

6. Apparatus according to claim 5, wherein said line is vertical.

7. Apparatus according to claim 2, wherein the set consists of three spatial filter apertures.

* * * * *

UNITED STATES PATENT AND TRADEMARK OFFICE
CERTIFICATE OF CORRECTION

PATENT NO.    : 6,950,560 B2
DATED         : September 27, 2005
INVENTOR(S)   : Martin Weston and William Beningfield Collis It is certified that error appears in the above-identified patent and that said Letters Patent is hereby corrected as shown below:

<u>Title page,</u>
Item [75], Inventor, insert -- William Beningfield Collis, Winchester (GB) --.

Signed and Sealed this

Seventh Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,950,560 B2  Page 1 of 1
APPLICATION NO. : 09/826392
DATED : September 27, 2005
INVENTOR(S) : Martin Weston and William Beningfield Collis It is certified that error appears in the above-identified patent and that said Letters Patent is hereby corrected as shown below:

On the Title Page, Item (73)
Assignee, Replace "Twickenham"
       With --Hampshire--

Signed and Sealed this

Twenty-first Day of August, 2007

JON W. DUDAS
*Director of the United States Patent and Trademark Office*